United States Patent [19]
Hahn et al.

[11] Patent Number: 6,017,979
[45] Date of Patent: Jan. 25, 2000

[54] CURE ORIENTATION BY DEPOSITING CURE ACCELERATORS ON THE SURFACE OF A FIBER

[75] Inventors: Bruce Raymond Hahn, Hudson; Douglas David Callander, Akron, both of Ohio

[73] Assignee: The Goodyear Tire & Rubber Company, Akron, Ohio

[21] Appl. No.: 08/056,721

[22] Filed: May 3, 1993

[51] Int. Cl.$^7$ ...................................................... C08K 9/04
[52] U.S. Cl. ........................................... 523/204; 524/503
[58] Field of Search ............................... 523/204; 524/503

[56] References Cited

U.S. PATENT DOCUMENTS

| | | | |
|---|---|---|---|
| 3,836,412 | 9/1974 | Boustany et al. | 156/62.2 |
| 4,659,754 | 4/1987 | Edwards et al. | 523/214 |
| 5,077,338 | 12/1991 | Tung et al. | 525/165 |

FOREIGN PATENT DOCUMENTS

| | | |
|---|---|---|
| 60155782 | 1/1984 | Japan . |
| 2029419 | 3/1980 | United Kingdom . |

OTHER PUBLICATIONS

Abstracts: AN 84–097849[16], JP–A–59 043 244, AN 81–41718D[23], SU–A–765 308.

*Primary Examiner*—Blaine Copenheaver
*Assistant Examiner*—John J. Guarriello
*Attorney, Agent, or Firm*—David E. Wheeler

[57] ABSTRACT

To control the orientation of curative groups in an elastomer formulation, in order to maximize the properties obtained in the vulcanized elastomer, cure accelerators are deposited on the surface of a fiber. This method results in a fiber type orientation of crosslink sites in an elastomer matrix, resulting in enhanced modulus properties. An added benefit of the method is the chemical attachment of the fiber to the elastomer formulation, which also results in enhanced modulus properties.

11 Claims, No Drawings

CURE ORIENTATION BY DEPOSITING CURE ACCELERATORS ON THE SURFACE OF A FIBER

BACKGROUND

The invention relates to reinforcement of elastomeric materials, especially rubber formulations.

Short fiber reinforcement in an elastomer results in increased modulus values, but lower break strengths. This is due to the poor adhesion between the fiber and the elastomer resulting in poor transfer of shear stresses between the rubber and the fiber. The poor adhesion is due to chemical and mechanical incompatibility between the fiber and the elastomer.

Chemical incompatibility arises from polar (fiber) and non-polar (elastomer) interactions. This problem can be minimized by grafting the elastomer to the fiber.

Mechanical incompatibility arises due to the large modulus differences between the fiber and the elastomer. Fibers, in general, have a very high modulus, and elastomers, comparatively, have a very low modulus. The large difference in modulus creates a weak interface between the fiber and the elastomer, and causes poor transfer of shear stresses which develop when an elastomer is compressed or stretched and rebounds. In accordance with the present invention, mechanical compatibility between an elastomer and a fiber embedded therein can be improved by creating a modulus gradient between the elastomer and the fiber.

It is an object of this invention to improve the chemical and mechanical compatibility of an elastomer and its fiber reinforcement. It is also an object of this invention to provide modulus gradients in an elastomer matrix. Other objects of the invention will be apparent from the following description and claims.

SUMMARY OF THE INVENTION

A method for forming domains of high density crosslinking in an elastomer matrix, and an elastomer matrix made using the method are provided. The method comprises the steps of; (A), treating textile fibers containing hydroxyl groups with a 5% to 50% aqueous solution of X—OH, wherein X represents a metallic cation, and converting the hydroxyl groups to their corresponding metal salt; (B), reacting the metal salt with carbon disulfide to convert the metal salt to a xanthate having the formula

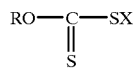

wherein RO is the residue of the textile fiber; (C), causing the oxidative coupling of xanthate groups using an oxidizing agent to form disulfurdicarbothionate groups of the formula

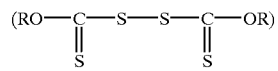

on the surface of the textile fibers to form a sulfur rich textile fiber; (D) mixing the sulfur rich textile fiber with uncured rubber, and; (E) curing a mixture of the fiber and uncured rubber by conventional means to form a high density of crosslink sites in the rubber in the proximity of the fibers.

In an illustrated embodiment, the method further comprises the step of selecting the X—OH solution of step (a) from the group consisting of NaOH, KOH, LiOH, $Mg(OH)_2$ and $Ca(OH)_2$.

In the illustrated embodiment, the method further comprises the step of selecting the oxidizing agent of step (c) from the group consisting of $H_2O_2$, $KHSO_5$, and $KMnO_4$.

Also in the illustrated embodiment, the method further comprises the step of selecting the rubber in step (d) from the group consisting of styrene butadiene (SBR), butadiene, nitrile, isoprene and mixtures thereof.

The method may also further comprise the step of orienting the sulfur rich textile fibers in the uncured rubber during the mixing step by the method of mixing.

Also provided is an elastomeric matrix comprising an elastomeric material having therein oriented sites characterized by a high density of crosslinking at the sites. In the elastomeric matrix, the oriented sites correspond to the presence of textile fibers which have been surface treated with a cure accelerator. The elastomeric matrix may be crosslinked with the textile fibers through the cure accelerator.

In an illustrated embodiment, the textile fibers comprise compounds having free hydroxyl groups which can be reacted to form xanthate groups. For example, the textile fibers may be selected from the group consisting of cotton, rayon, other cellulose derivatives, and polyvinyl alcohol (PVA).

In the illustrated embodiment, the elastomeric material is selected from the group consisting of SBR, 1,4 polyisoprene rubber, polybutadiene, and nitrile rubber.

Also, in the illustrated embodiment, the cure accelerator is selected from the group consisting of

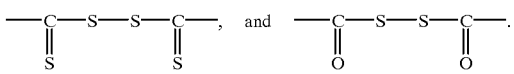

It has been found, in the illustrated embodiment, that the oriented, high cross-link density sites cause an increase of 40–50% in the 50% modulus, and an increase in tensile strength of 33–43% over the same composition without such oriented sites.

DETAILED DESCRIPTION OF THE INVENTION

Chemical and mechanical interaction between an elastomer and fiber reinforcement can be improved by depositing cure accelerators, which increase the crosslinking in the elastomer, on the surface of the fibers used for reinforcement of the elastomer. In order to assure that the cure accelerators remain with the fibers during mixing of the fibers into the elastomer, it is desirable that the accelerators be bonded or attached to the fiber. Attachment of the accelerator to the fiber also makes possible the bonding of the fiber to the elastomer, through the accelerator. Improved bonding of fiber reinforcement to an elastomer increases the modulus and cut resistance of the elastomer Since the accelerator increases the rate of crosslinking of a curable elastomer, and the accelerator is maintained in the proximity of the fiber until the elastomer is cured, there is increased crosslinking in the elastomer in the proximity of the fiber. Also, since an accelerator tends to diffuse into an elastomer under the high temperature of curing, a gradient of crosslinking density is established in the elastomer, in direct relation to the amount of diffusion that takes place. In general, the highest density of crosslinking takes place in the proximity of the fiber, and the crosslinking density around the fiber decreases as a function of the distance from the fiber. A gradient of crosslinking density improves the mechanical interaction between the elastomer and the fiber since the energy needed to distort the elastomer matrix increases as distortion approaches an embedded fiber, and this tends to dissipate energy before it can cause friction between the fiber and the elastomer matrix.

In the illustrated embodiment, fibers having free hydroxyl groups in their chemical composition are used in the method of the invention. Examples of such fibers are fibers made from cellulose, such as cotton and rayon. Other such fibers are derived from chitin, such as chitosan. Synthetic fibers, such as polyvinyl alcohol (PVA), can also be used.

Those skilled in the art will recognize other types of fibers that can be used in the invention.

Accelerators used in the illustrated embodiment have dithionite bonding. Examples of such accelerators are the groups

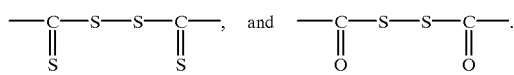

Other accelerators that can be used in the invention will be apparent to those skilled in the art.

Elastomers that can be used in the invention include diene type rubbers such as 1,4 polyisoprene, polybutadiene, styrene butadiene (SBR), nitrile and mixtures thereof.

In the illustrated embodiment, cellulose fibers, for example cotton fibers; are treated in a xanthate type process, followed by oxidative coupling of the xanthogen groups. The result is the formation of disulphurdicarbothionate groups of the formula (R—O—C(S)—S—S—C(S)—O—R) on the fiber surface. These fibers are then mixed into an elastomer formulation and the elastomer is vulcanized.

Using the method of the invention, cotton fibers, with disulfide cure accelerators attached, were incorporated into rubber. The accelerators react during curing of the elastomer to speed up the crosslinking of the elastomer, and increase the amount of crosslinking.

Disulfide groups split under the temperatures of vulcanization, and the free sulfide reacts to promote cure around the fiber, resulting in a modulus gradient from the rubber to the fiber, improving the mechanical compatibility of the elastomer with the fiber. The sulfide group still attached to the fiber also reacts with the elastomer, causing a grafting of the fiber to the elastomer, improving the chemical compatibility between the fiber and the elastomer.

Accordingly, in the illustrated embodiment, the method comprises the steps of; (A), treating textile fibers containing hydroxyl groups with a 5% to 50%, preferably 15 5 to 30% aqueous solution of X—OH, wherein X represents a metallic cation, and converting the hydroxyl groups to their corresponding metal salt; (B), reacting the metal salt with carbon disulfide to convert the metal salt to a xanthate having the formula

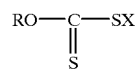

wherein RO— is the residue of the textile fiber; (C), causing the oxidative coupling of xanthate groups using an oxidizing agent to form disulfurdicarbothionate groups of the formula

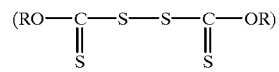

on the surface of the textile fibers to form a sulfur rich textile fiber; (D) mixing the sulfur rich textile fiber with uncured rubber, and; (E) curing a mixture of the fiber and uncured rubber by conventional means to form a high density of crosslink sites in the rubber in the proximity of the fibers.

The X—OH solution of step (a) may be selected from the group consisting of NaOH, KOH, LiOH, $Mg(OH)_2$ and $Ca(OH)_2$.

The oxidizing agent of step (c) may be selected from the group consisting of $H_2O_2$, $KHSO_5$, and $KMnO_4$.

The rubber in step (d) may be selected from the group consisting of SBR, polybutadiene, polyisoprene, nitrile and mixtures thereof.

The method may also further comprise the step of orienting the sulfur rich textile fibers in the uncured rubber during the mixing step by the method of mixing.

It is well known by those skilled in the art that fibers may be oriented (disposed substantially parallel to one another) by milling or extruding the rubber compound. Other methods of orienting fibers in an elastomer matrix will be apparent to those skilled in the art.

Also provided is an elastomeric matrix made according to the method of the invention, which comprises an elastomeric material having therein oriented sites characterized by a high density of crosslinking at the sites. In the elastomeric matrix, the oriented sites correspond to the presence of textile fibers which have been surface treated with a cure accelerator. The elastomeric matrix may be crosslinked with the textile fibers through the cure accelerator.

In an illustrated embodiment, the textile fibers comprise compounds having free hydroxyl groups which can be reacted to form xanthate groups.

The textile fibers used in the invention may comprise filaments, cords, tows of filaments or short fibers, and as used herein, the term "fibers" includes any such entity. The method of the invention can be used to improve adhesion of an elastomer to textiles in products such as tires, e.g. in fabrics (such as those used in carcass plies or belts), filaments or cords (such as in spiral overlays) or short fibers (such as those sometimes used in cushion stock).

When short fiber reinforcement is used, it is preferred that the concentration of short fiber be in the range of 1 to 30 phr, preferably 1 to 10 phr.

Since the accelerator on the short fiber is concentrated primarily along the length of the short fiber, and diffusion of the accelerator takes place mainly along the short fibers length, it is believed that domains of high crosslinking density around a short fiber will have an aspect ratio of about 40% of the aspect ratio of the short fiber. It is believed that in the illustrated embodiment, the aspect ratio of the highly crosslinked domains will be 20 to 1.

It has been found, in the illustrated embodiment, that the oriented, high cross-link density sites cause an increase of 40–50% in the 50% modulus, and an increase in tensile strength of 33–43%, over the same elastomer prepared without such oriented sites.

The invention is further illustrated with reference to the following examples.

EXAMPLE 1

Cotton fibers have been treated with aqueous potassium hydroxide and $CS_2$, followed by oxidation, in order to prepare disulfurdicarbothionate groups on the fiber surface. These groups are known cure accelerators. The treated cotton fibers were compounded into a rubber recipe at 5 PHR. The 50% modulus of the elastomer was increased 45%, and the tensile strength 38%, over a control containing 5 PHR of untreated cotton fibers.

Experimental Procedure: Cotton fibers, 10 g, were immersed in 600 ml of a 15% aqueous KOH solution and stirred at 50 C for one hour. The fibers were then filtered, washed with water and dried. These fibers were then immersed into carbon disulfide and stirred overnight. A slight orange color developed on the fiber surface. The fibers were filtered and dried.

One half of the fibers were removed, and p-toluenesulfenyl chloride (2 g) was added to the fibers at 0° C. The solution was allowed to warm to room temperature, and the fibers were filtered, washed and dried.

One half of the fibers (remaining after separation as described above) were immersed into water, and 20 ml of a 30% hydrogen peroxide solution was added to the water mixture, and the mixture was stirred at room temperature for one hour. The orange color on the fibers disappeared. The fibers were then filtered and dried overnight in a vacuum oven. The fibers were then incorporated into the following rubber formulation:

| Ingredient | Type | Amount in phr |
|---|---|---|
| 1. cis,1,4-polyisoprene | elastomer | 100 |
| 2. carbon black, general purpose tread | filler | 45 |
| 3. petroleum process oil | plasticizer | 9 |
| 4. N-phenyl-N'-(1,3 dimethyl/butyl) N-phenyl-P-phenylenediamine | antidegradant | 2 |
| 5. mixed diaryl-P-phenylene diamine | antidegradant | 1 |
| 6. paraffinic/micro crystalline wax | processing aid | 1 |
| 7. stearic acid | activator | 3 |

Brabender Mixer Compounding

A Brabender mix at 70 rpm using a 120° C. oil bath, was used for non productives (ingredients 1–7). Mix time was 5 minutes, and the drop temperature was approximately 270° F.

The non-productive mixes were used for further compounding by reloading the non-productives in the mixer and adding the following ingredients:

| | | | |
|---|---|---|---|
| 8. Sulfur | curative | 1.6 |
| 9. N, N' diphenyl guanidine | accelerator | 0.4 |
| 10. 2 (morpholino-thio) benzothiazole | accelerator | 0.8 |
| 11. Zinc oxide | accelerator | 3 |

Productive mixes (non-productive plus the accelerators and vulcanizing agents, (ingredients 8–11) were carried out without external heating at 50 rpm for 3 minutes. The compounded elastomers were cured at 150° C. The vulcanizate physical properties of the reinforced elastomer were compared to that of a control compound comprising the above formulation prepared without the addition of a fiber reinforcement containing polyisoprene, carbon black, processing oil and curatives.

Unless otherwise specified, all the examples are the same except for the different 1b materials specified.

The fibers with the $CS_2$, hydrogen peroxide treatment resulted in a rubber composite with modulus values increased by 39, 44, and 30% for the 50, 100 and 300% rubber modulus respectively, over a the same rubber formulation reinforced with untreated fibers. The maximum strength also increased by 39%, over the same rubber formulation which included untreated fibers, with equivalent elongation to break.

The fibers were added in addition to the 45 phr carbon black. The control sample had 5 PHR of untreated cotton fibers, while the two experimental samples each had 5 PHR of treated cotton fibers.

Table 1 shows the cure and tensile properties for the control and the two types of treated-fiber containing samples.

TABLE 1

Cure Rheometer and Tensile Properties for 5 PHR Cotton Fiber Loaded Samples

| Sample | T2 | T90 | S | Modulus (MPa) 50 | 100 | 300 | TS | EB |
|---|---|---|---|---|---|---|---|---|
| Control | 7.8 | 13.6 | 26.5 | 4.3 | 5.8 | 11.4 | 16.8 | 340 |
| pTsCl Treated | 7.2 | 12.8 | 25.4 | 4.8 | 6.5 | 13.8 | 19.1 | 349 |
| $H_2O_2$ Treated | 7.2 | 13.2 | 25.3 | 6.2 | 8.3 | 19.2 | 23.3 | 365 |

In the table, TS is tensile strength, and EB is the elongation at break.

The cure properties T2, T90 and S (S is a measure of torque as determined by arheometer during cure), are similar for all three rubber samples, however the T2 and T90 times are slightly shorter for the treated fibers. The faster cure times are believed to be due to the presence of the accelerators on the fiber surface.

The tensile properties are improved for both the experimental examples. The hydrogen peroxide coupled samples show large improvements over the untreated cotton fibers. The coupling of the xanthates is more efficient using hydrogen peroxide. The tosyl chloride treated fibers had a slight amount of color from the xanthate salt, while the peroxide treatment produced pure white fibers.

The attachment of cure accelerators, along the surface of cotton fibers, greatly improves their interaction with rubber. Both the modulus and tensile strength are improved over controls with untreated cotton fibers. The invention offers both a method to increase fiber to elastomer interaction and a method to control the cure morphology of the elastomer.

While the invention has been specifically illustrated and described, those skilled in the art will recognize that the invention can be variously modified and practiced without departing from the spirit of the invention. The scope of the invention is defined by the following claims.

What is claimed is:

1. A method for forming domains of high density crosslinking in an elastomer matrix comprising the steps of
    (a) treating textile fibers containing hydroxyl groups with a 5% to 50% aqueous solution of X—OH wherein X represents a metallic cation, and converting said hydroxyl groups to their corresponding metal salt, (b) reacting said metal salt with carbon disulfide to convert said metal salt to a xanthate having the formula $$RO-\underset{\underset{S}{\|}}{C}-SX$$

wherein RO is the residue of said textile fiber, (c) causing the oxidative coupling of xanthate groups using an oxidizing agent to form disulfurdicarbothionate groups of the formula $$(RO-\underset{\underset{S}{\|}}{C}-S-S-\underset{\underset{S}{\|}}{C}-OR)$$

on the surface of said textile fibers to form a sulfur rich textile fiber, (d) mixing said sulfur rich textile fiber with uncured rubber, and (e) curing a mixture of said fiber and uncured rubber by conventional means to form high density crosslink sites in said rubber in the proximity of said fibers.

2. The method of claim 1 comprising the further step of selecting the X—OH solution of step (a) from the group consisting of NaOH, KOH, LiOH, Mg(OH)$_2$ and CA(OH)$_2$.

3. The method of claim 1 comprising the further step of selecting the oxidizing agent of step (c) from the group consisting of H$_2$O$_2$, KHSO$_5$, and KMnO$_4$.

4. The method of claim 1 comprising the further step of selecting the rubber in step (d) from the group consisting of SBR, butadiene rubber, isoprene rubber, nitrile rubber, and mixtures thereof.

5. The method of claim 1 further comprising the step of orienting said sulfur rich textile fibers in said uncured rubber during the mixing step by the method of mixing.

6. An elastomeric matrix comprising an elastomeric material having therein sites of high density crosslinking of said elastomer which correspond to the presence of textile fibers which have been surface treated with cure accelerator, wherein the highest degree of crosslinking of said elastomer occurs in the proximity of said fiber, and in which said elastomeric material is crosslinked to said textile fibers through said cure accelerator.

7. The elastomeric matrix of claim 6 wherein said textile fibers comprise compounds having free hydroxyl groups which can be reacted to form xanthate groups.

8. The elastomeric matrix of claim 7 wherein said textile fibers are selected from the group consisting of cotton, rayon, and PVA.

9. The elastomeric matrix of claim 6 wherein said elastomeric material is selected from the group consisting of SBR, polybutadiene rubber, polyisoprene rubber, nitrile rubber and mixtures thereof.

10. The elastomeric matrix of claim 6 in which said cure accelerator comprises the group $$-\underset{\underset{S}{\|}}{C}-S-S-\underset{\underset{S}{\|}}{C}-\ .$$

11. The elastomeric matrix of claim 6 wherein said high density cross-link sites are oriented and said oriented sites cause an increase of 40–50% in the 50% modulus and a tensile strength of 33–43% over the same compound without said oriented sites.

* * * * *